United States Patent [19]

Pelz

[11] Patent Number: 4,673,151

[45] Date of Patent: Jun. 16, 1987

[54] TWIST CLIP

[75] Inventor: Edward C. Pelz, Grabill, Ind.

[73] Assignee: Navistar International Corporation, Chicago, Ill.

[21] Appl. No.: 771,447

[22] Filed: Aug. 30, 1985

[51] Int. Cl.⁴ .............................................. F16L 3/08
[52] U.S. Cl. .................................... 248/74.1; 248/65; 24/336; 24/545
[58] Field of Search ...................... 24/545, 563, 265 C, 24/336, 489, 487; 248/74.1, 65; 223/91, 93, 96

[56] References Cited

U.S. PATENT DOCUMENTS

| | | | |
|---|---|---|---|
| 370,214 | 9/1887 | Smith | 24/489 |
| 541,420 | 6/1895 | Bookhout | 248/74.1 |
| 568,452 | 9/1896 | McCallum | 248/65 |
| 853,040 | 5/1907 | Taber | 248/65 |
| 1,057,057 | 3/1913 | Hoerr | 248/65 |
| 1,069,937 | 8/1913 | Goehst et al. | 248/74.1 |
| 1,286,103 | 11/1918 | Reed | 248/65 |
| 1,549,142 | 8/1925 | McKenzie et al. | 24/563 |
| 1,899,982 | 3/1933 | Olson | 24/489 |
| 2,092,681 | 9/1937 | Reilly | 24/563 |
| 2,616,646 | 11/1952 | Matthysse | 248/65 |
| 2,629,585 | 2/1953 | Truchon, Jr. | 24/489 |
| 2,742,249 | 4/1956 | Benya | 248/65 |
| 3,167,836 | 2/1965 | Walter | 24/265 C |
| 3,243,151 | 3/1966 | Varney et al. | 248/74.1 |
| 3,436,108 | 4/1969 | Van Buren, Jr. | 24/336 |
| 4,039,744 | 8/1977 | Seaquist | 248/65 |

FOREIGN PATENT DOCUMENTS

| | | | |
|---|---|---|---|
| 705325 | 3/1941 | Fed. Rep. of Germany | 248/65 |
| 1286788 | 1/1962 | France | 248/74.1 |
| 1418227 | 10/1965 | France | 248/65 |
| 448202 | 3/1968 | Switzerland | 248/74.1 |
| 315048 | 7/1929 | United Kingdom | 248/74.1 |

Primary Examiner—Victor N. Sakran
Attorney, Agent, or Firm—F. David AuBuchon; Dennis K. Sullivan

[57] ABSTRACT

A twist clip is provided for supporting tubular objects on structural members. The inventive twist clip has opposing fingers which surround and retain the tubular object. The clip fingers are axially separated along the installed tube to allow the tubular object to be angularly inserted.

12 Claims, 4 Drawing Figures

U.S. Patent  Jun. 16, 1987  4,673,151
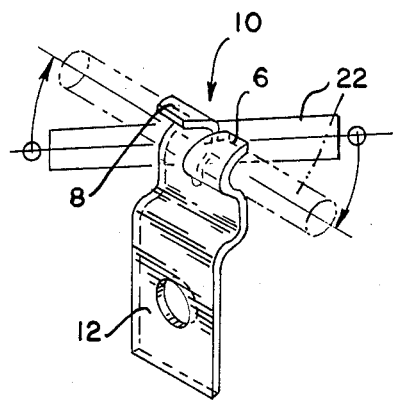
_Fig_1_
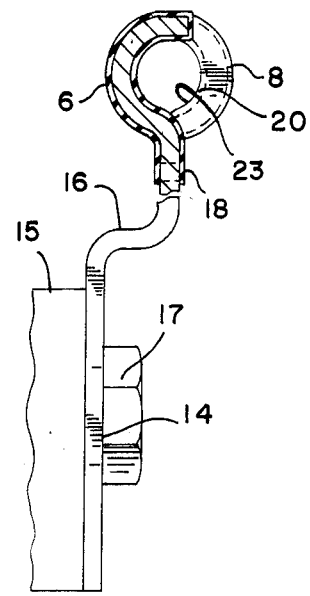
_Fig_2_
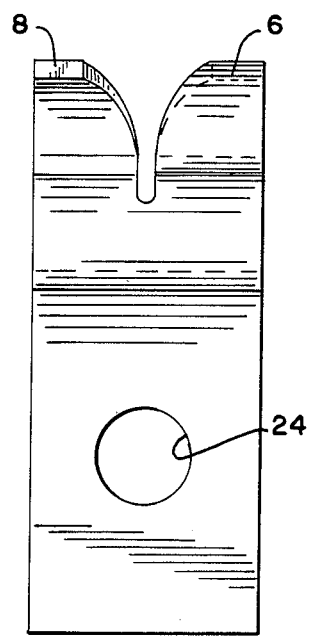
_Fig_3_
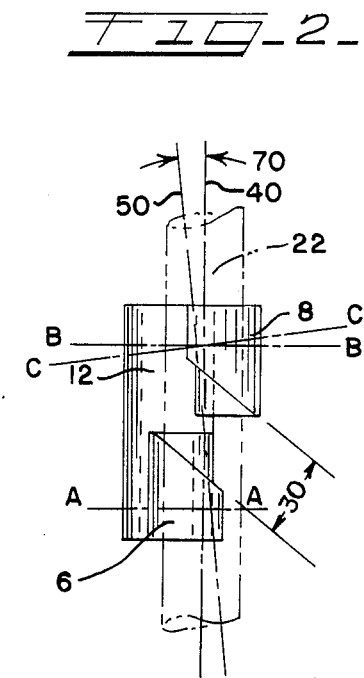
_Fig_4_

TWIST CLIP

FIELD OF THE INVENTION

The field of the present invention is that of clips for attaching tubular objects to structural members.

DISCLOSURE STATEMENT

Mechanical structures, such as truck frames, commonly have attached to them various axially elongated members. Examples of such members are hydraulic lines, fuel lines, and electrical cables. It is customary in the manufacture of a truck that the opposite ends of the elongated member be attached first to establish leakproof connections. For example, the opposite ends of the fuel lines are attached to the fuel tank and to the vehicle engine leaving the intermediate section of the fuel line to be attached to the truck frame at a later point of assembly.

When the opposite ends of the fuel line are attached first, one of two manufacturing techniques must be utilized to install a clip. If non-adjustable clips are used, the clips which clamp the intermediate sections of the fuel line to the truck frame must be placed over the ends of the fuel line before the ends of the fuel line are formed, for example, if flared tubing fittings are used, or are attached to the engine and fuel tank. If an adjustable clip is used to clamp the intermediate section of the fuel line, the clip must be tightened in position to retain the fuel line within the clip.

SUMMARY OF THE INVENTION

To overcome the disadvantages of prior clips the present invention is brought forth. The present invention is a twist clip which has projecting from its body two opposing fingers, each of which partially surround the elongated member or tubular object. The opposing fingers are axially spaced along the tubular object a sufficient amount to allow the tubular object to be angularly inserted therebetween, or in the alternative to allow the clip to be twisted onto the tubular object. With the inventive twist clip there is no need for adjustment, or for attaching intermediate clips on the tubular object before attachment of the opposite ends of the tubular object to a structural member.

It is an object of the present invention to provide a clip which can retain the intermediate portion of a tubular object to a structural member without sliding the clip over the end of the tubular object. It is an object of the present invention to provide a clip for supporting a tubular object from a structural member wherein the tubular object may be angularly inserted into the clip and locked into place by a simple rotation of the clip. It is also an object to provide a clip for supporting a tubular object from a structural member which provides secure retention of the tubular object without adjustment of the clip.

Other objects and advantages of the present invention will become apparent to those skilled in the art as the nature of the invention is better understood from the accompanying drawings and detailed description.

BRIEF DESCRIPTION OF THE DRAWINGS

FIG. 1 is a perspective view of the present invention illustrating the insertion of an axially elongated member;

FIG. 2 is a side elevational view partly in section of the twist clip of FIG. 1 and illustrating an optional rubber coating therefor;

FIG. 3 is a front elevational view of the inventive twist clip illustrated in FIG. 1; and FIG. 4 is a top elevation view of the twist clip also illustrating a retained axially elongated member in phantom.

DETAILED DESCRIPTION OF THE DRAWINGS

Referring to FIGS. 1, 2, 3 and 4, clip 10 has three major components, body 12, fingers 8 and 6. Clip 10 can be easily fabricated from a single piece of sheet metal.

Body 12 has three distinct sections. Base section 14 allows the clip to be attached to a structural member 15 and has an aperture 24 therein to allow attachment by bolt 17 if desired. Projecting from base section 14 is intermediate section 16, which further connects with upturned section 18 which is parallel to section 14. Section 18 and section 16 cooperate to provide an offset for an elongated member 22 from the structural member surface, which would be parallel to section 14.

Projecting upwardly from section 18 are two semicylindrical fingers 8 and 6. Both fingers are formed to partially surround the elongated member 22 by slightly more than 180° and are opened in opposite facing directions to define a cylindrical opening 23 extending therethrough within which the elongated member 22 is installed. Fingers 8 and 6 sphincterally engage or grip elongated member 22 in parallel substantially radial planes A—A and B—B respectively. To preserve ease of installation fingers 8 and 6 should not surround elongated member 22 by more than 200°.

As shown in FIG. 2, the entire upper section 18 of the clip 10 may optionally be provided with an elastomeric or polymeric coating to increase the friction grip of the clip with the elongated member 22 and prevent rattling which can be associated when using a metallic clip with a metallic tubular object. Of course, the clip could also be formed from a nonmetallic rigid material.

The fingers 6 and 8 need not be semicylindrical as illustrated but may be formed to any desired shape which will retain a tube disposed parallel to surface of section 18. For example, they may be formed in an angular partial tubular shape to be more readily fitted upon elongated members with rectangular cross sections.

The fingers 6 and 8 are spaced axially along the elongated member 22 and are formed as by shearing the inner corners thereof, to provide an intervening acute angular cut or gap 30 between the two fingers to closely receive the elongated member to be inserted in the clip. The gap could be of any acute angle to one of the sphincteral planes A—A or B—B. An acutely angled gap 30 as illustrated is preferred to minimize the axial spacing between the fingers 6 and 8 along the installed elongated member 22 and thus make it more difficult for the elongaged member 22 to be pulled out of the clip. Preferably, the gap 30 is disposed at a 45° angle to the planes A—A or D—D although angles within a range from 35° to 50° would also be suitable.

In operation, the elongated member 22 is angularly inserted through gap 30 into the clip 10, or in the alternative, the clip 10 may be installed onto the elongated member 22. The clip is then rotated relative to the tube until the inner peripheries of the semicylindrical surfaces of fingers 6 and 8 contact the tube, and the twist clip 10 is then secured in that position to the structural member. To function properly, the elongated object 22 will have some structural support or retention independent of the clip 10 to prevent the elongated object 22 from twisting out of the clip 10.

If desired, the opening 23 between the fingers 6 and 8 may be made slightly smaller than the diameter of elongated member 22. The fingers 6 and 8 will undergo elastic deformation during insertion of elongated member 22, and will then retain elongated member 22 in an interference fit.

In many applications, the desired installed axial centerline of elongated member 22 will be parallel to the structural member 15 and to the surface of section 14. Also, the axial center line 40 of installed elongated member 22 will be coextensive with the cylindrical axis of the fingers 6 and 8. To increase the grip, or axial retention of elongated member 22 within the fingers 6 and 8, clip 10 may be formed with a cylindrical axis 50, slightly turned from axial center line 40 by angle 70 which need be only one or two degrees. Cylindrical axis 50 is not parallel with surface 14. By the tightening of screw 17, opening center line 50 will be torqued into alignment with the axial center line 40 of elongated member 22, increasing the force of retention of fingers 6 and 8.

Another method of increasing the retention of elongated member 22 within fingers 6 and 8 is to have the planes of sphincteral gripping to be slightly nonparallel prior to installation as illustrated between planes A—A and C—C. Installation of the clip results in plane C—C being urged to coincidence with plane B—B (parallel relationship with plane A—A).

Still another method to increase the retention is to have the tubular (cylindrical) axes of fingers 8 and 6 respectively, to be noncoterminous with one another. Installation of tube 22 will urge cylindrical axes into a coterminous relationship.

It is apparent to those skilled in the art that the distortion between the installed axial center line 40 of elongated member 22 and the cylindrical center line of fingers 8 or 6 may be utilized to increase the grip in other applications where it is not desired for axial center line 40 to be parallel to the surface of structural member 15.

While a few embodiments of the present invention have been explained, it will be readily apparent that those skilled in the art that other modifications can be made to the present invention without departing from the spirit and scope of this application as encompassed by the following claims.

What is claimed is:

1. A clip for retaining an axially elongated object on a structural number comprising:
   a body for attachment to said structural member;
   a first finger projecting from said body for partially surrounding and sphincterally engaging said elongated object in a first substantially radial plane with respect to said elongated object, said first finger being open in a first direction;
   a second finger projecting from said body for partially surrounding and sphincterally engaging said elongated object in a second substantially radial plane with respect to said elongated object, said second finger being open in a direction opposite said first direction, said second finger being spaced from said first finger and forming a gap therebetween, the width of said gap being substantially the same as the width of said elongated object to closely receive said elongated object, said gap being disposed at an acute angle between 35° and 50° to said planes and being circumferentially oriented relative to said fingers to permit said elongated object to be rotated from within said gap to a position perpendicular to said first and second radial planes.

2. A clip as described in claim 1 wherein said first and second planes are parallel.

3. A clip as described in claim 1 wherein said acute angle is 45°.

4. A clip as described in claim 1 wherein said fingers surround said elongated object more than 180° and less than 200°.

5. A clip as described in claim 1 wherein a cross section of said fingers parallel to said first plane forms a semicircle.

6. A clip as described in claim 5 wherein said fingers form a partial cylinder with a diameter slightly smaller than the diameter of said elongated object and said fingers are elastically deformed for surrounding said elongated object.

7. A clip as described in claim 1 wherein said body has a first section for attachment to said structural member, a second section angularly projecting from said first section and a third section attached to said second section being parallel to said first section, wherein said fingers project from said third section.

8. A clip as described in claim 1 wherein said line intersecting and perpendicular to said first and second planes is parallel with said first section.

9. A clip as described in claim 1 fabricated from a metallic material and said clip further comprising a polymeric coating on said fingers.

10. A clip for retaining an axially elongated object on a structural number comprising:
    a body for attachment to said structural member;
    a first finger projecting from said body for partially surrounding and sphincterally engaging said elongated object in a first substantially radial plane with respect to said elongated object, said first finger being open in a first direction;
    a second finger projecting from said body for partially surrounding and sphincterally engaging said elongated object in a second substantially radial plane with respect to said elongated object nonparallel to said first plane prior to installation of said clip to said axially elongated object and said structural member, said second finger being open in a direction opposite said first direction, said second finger being spaced from said first finger and forming a gap therebetween, the width of said gap being substantially the same as the width of said elongated object to closely receive said elongated object, said gap being disposed at at an acute angle between 35° and 50° with said planes and being circumferentially oriented relative to said fingers to permit said elongated object to be relatively rotated from within said gap to a position perpendicular to said first and second radial planes and whereupon installation of said clip to said elongated object and said structural member causes said clip to deform to urge said first and second planes into a parallel relationship.

11. A clip for retaining an axially elongated object on a structural member comprising;
    a body for attachment to said structural member;

a first finger projecting from said body forming a partial tube with a first tubular axis for partially surrounding said elongated object, said finger being open in a first direction;

a second finger projecting from said body forming a partial tube with a second tubular axis noncoterminous with said first tubular axis prior to installation of said clip to said axially elongated object and said structural member for partially surrounding said elongated object, said finger being open in a direction opposite said first direction and being spaced from said first finger to form a gap to closely receive said elongated object at an acute angle to said first tubular axis, and wherein installation of said clip to said axially elongated member causes said clip to deform to urge said first and second tubular axis into a coterminous relationship.

12. A clip for retaining an axially elongated tubular object on a structural member comprising:

a metallic body having a first section for attachment to said structural member by a bolt, a second section angularly projecting from said first section, and a third section attached to said second section being parallel to said first section;

a first elastomeric coated deformable finger projecting from said body for partially surrounding said elongated object more than 180° forming a partial cylinder with a diameter smaller than the diameter of said elongated object and having a first cylindrical axis, said first finger being open in a first direction;

a second elastomeric coated deformable finger projecting from said body for partially surrounding said elongated object more than 180° forming a partial cylinder with a diameter smaller than the diameter of said elongated object and having a cylindrical axis substantially coterminous with said first cylindrical axis, said second finger being spaced from said first finger and forming a gap therebetween having a width substantially equal to the diameter of said elongated object to closely receive said elongated object, said gap being disposed at a 45° angle with said first cylindrical axis.

* * * * *